(12) United States Patent
Keck

(10) Patent No.: US 6,247,223 B1
(45) Date of Patent: Jun. 19, 2001

(54) METHODS OF MAKING AN ELECTRIC MOTOR AND THRUST BEARING ASSEMBLY FOR SAME

(75) Inventor: Arthur C. Keck, Fort Wayne, IN (US)

(73) Assignee: General Electric Company, Fort Wayne, ID (US)

(*) Notice: Subject to any disclaimer, the term of this patent is extended or adjusted under 35 U.S.C. 154(b) by 0 days.

(21) Appl. No.: 08/155,987

(22) Filed: Nov. 22, 1993

Related U.S. Application Data

(62) Division of application No. 07/843,006, filed on Feb. 28, 1992, now Pat. No. 5,277,500.

(51) Int. Cl.$^7$ ............................................. H02K 15/02
(52) U.S. Cl. ..................... 29/596; 29/598; 29/898.041; 310/90
(58) Field of Search .................... 384/203, 204, 384/223, 412, 420, 424; 310/90; 29/596, 598, 898.041

(56) References Cited

U.S. PATENT DOCUMENTS

| | | |
|---|---|---|
| 3,553,511 | 1/1971 | Hemmings et al. .................. 310/156 |
| 3,573,510 | 4/1971 | Otto ..................................... 384/412 |
| 3,624,434 | 11/1971 | Dafler ................................... 310/90 |
| 3,786,289 * | 1/1974 | Baclawski et al. ..................... 310/90 |
| 3,789,251 | 1/1974 | King ..................................... 310/239 |
| 4,008,928 | 2/1977 | Abel . |
| 4,245,870 | 1/1981 | Punshon et al. . |
| 4,293,170 * | 10/1981 | Brezosky .............................. 384/275 |
| 4,295,268 | 10/1981 | Punshon et al. ........................ 29/596 |
| 4,308,478 | 12/1981 | Mertz ..................................... 310/90 |
| 4,309,062 | 1/1982 | Bischoff . |
| 4,456,845 * | 6/1984 | Cunningham .......................... 310/90 |
| 4,533,260 * | 8/1985 | Andrieux ............................. 384/206 |
| 4,598,220 | 7/1986 | Stone ..................................... 310/90 |
| 4,711,590 | 12/1987 | Lakin .................................. 384/206 |
| 4,800,309 | 1/1989 | Lakin ..................................... 310/90 |
| 4,887,916 | 12/1989 | Adam et al. .......................... 384/192 |
| 4,955,791 | 9/1990 | Wrobel ................................ 417/354 |

FOREIGN PATENT DOCUMENTS

| | | |
|---|---|---|
| 2 212 186 | 9/1973 | (DE) . |
| 1 200 765 | 12/1959 | (FR) . |
| 2 452 652 | 10/1980 | (FR) . |
| 2 054 759 | 2/1981 | (GB) . |

* cited by examiner

*Primary Examiner*—Carl E. Hall
(74) *Attorney, Agent, or Firm*—Damian Wasserbauer

(57) ABSTRACT

A fractional horsepower motor has a thrust bearing assembly mounted on the motor shaft to dampen the axial movement of the shaft. The assembly includes a thrust collar formed of resinous material and a thrust plate formed of metal with a wave spring positioned therebetween. Apertures in the thrust plate receive resilient hook projections formed on the thrust collar as a means for coupling the plate to the collar. Torque transmitting projections formed on the thrust collar engage notches formed in the thrust plate. The hook projections and the torque transmitting projections act together to capture and hold the wave spring between the collar and plate.

17 Claims, 3 Drawing Sheets

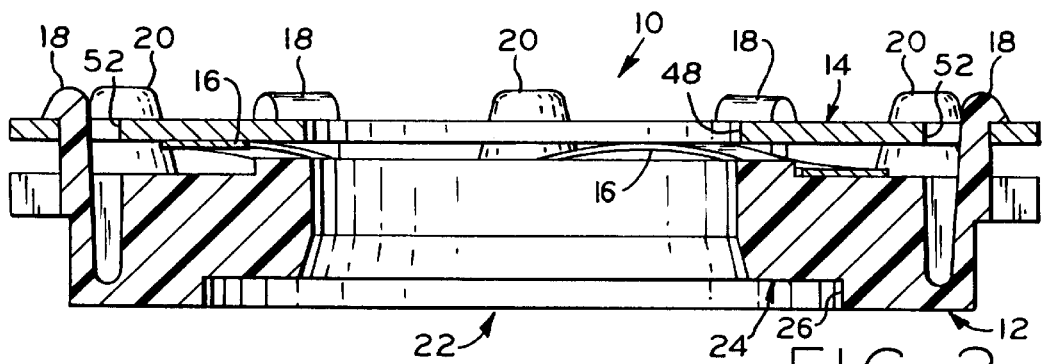
FIG_2
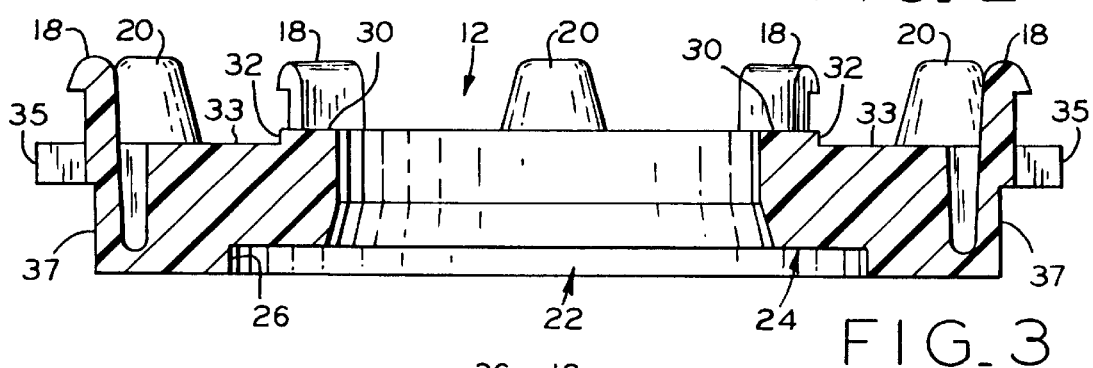
FIG_3
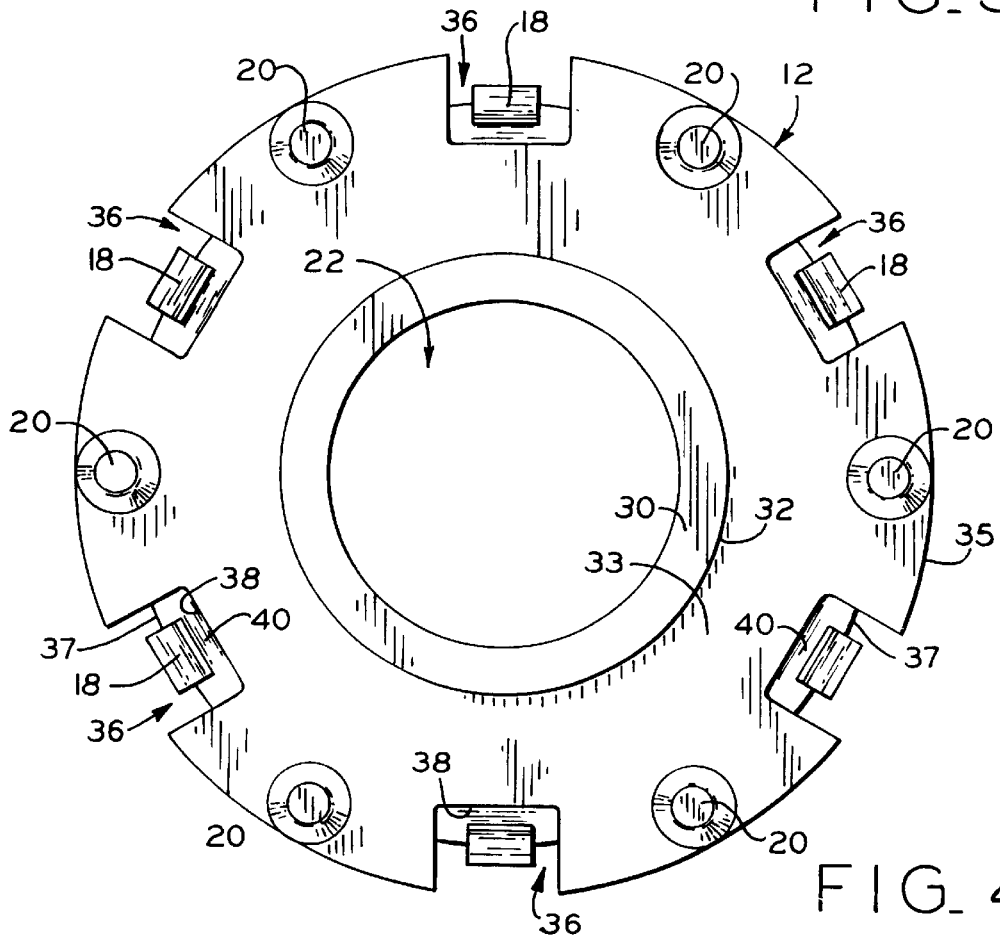
FIG_4

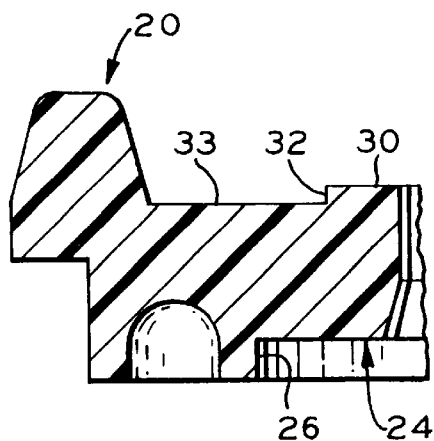
FIG_5
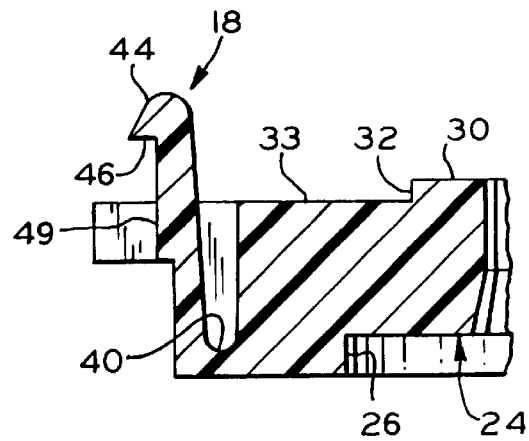
FIG_6
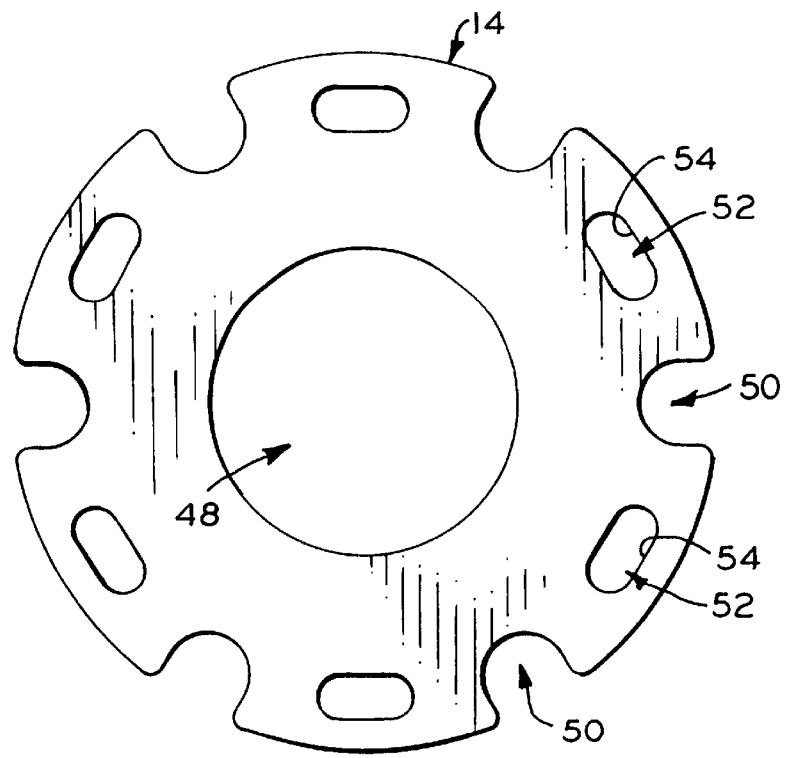
FIG_7

METHODS OF MAKING AN ELECTRIC MOTOR AND THRUST BEARING ASSEMBLY FOR SAME

This is a divisional of application Ser. No. 07/843,006 filed Feb. 28, 1992, now U.S. Pat. No. 5,277,500, issued on Jan. 11, 1994.

BACKGROUND AND SUMMARY OF THE INVENTION

This invention relates generally to bearing assemblies and, more particularly, to thrust bearing assemblies for mounting on a motor shaft.

In fractional horsepower electric motors, the rotor and motor shaft assembly tends to move axially within the housing and against the end plates and bearing means supported in the end plates. Such axial movement of the motor shaft must be limited for proper motor operation since excessive end play is detrimental to machine performance. Additionally, axial vibration gives rise to an objectionable knocking or bumping sound from within the motor. Consequently, thrust bearings are conventionally carried by the motor shaft between the rotor and the bearings mounted in the end plates.

Numerous configurations of such bearings are known. There are, for example, the configurations illustrated and described in U.S. Pat. Nos. 3,573,510; 3,624,434; 4,955,791; 4,887,916; 3,553,511; 4,008,928; 3,789,251; 4,295,268; 4,245,870; 4,800,309; 4,308,478; and, 4,711,590.

In the past, the thrust bearing arrangements for such motors have involved a number of separate components resulting in the need to assemble a number of loose parts at the time of motor assembly. Furthermore there was considerable tolerance build-up of the thrust assembly for free end play control of the motor rotor. Prior designs also tended to use elastomers, such as cushion washers, that deteriorated in the presence of lubricants and reactants that accumulate during motor operation over a wide range of temperature and other operating conditions.

According to the present invention, a thrust bearing assembly for mounting on a motor shaft includes a thrust plate and a thrust collar including first means for joining the thrust plate to the thrust collar, and second means for resiliently damping axial movement of the motor shaft. The second means is positioned between the thrust collar and the thrust plate.

Illustratively, the thrust collar comprises an outer perimeter, and the first means includes perimetrally spaced-apart resilient hook projections and a plurality of perimetrally spaced-apart torque transmitting projections.

In one embodiment of the invention, the thrust plate is formed to include perimetrally spaced-apart apertures to receive the resilient hook projections. The thrust plate further includes a plurality of perimetrally spaced-apart notches into which ends of the torque transmitting projections extend. The hook projections alternate with the torque transmitting projections on the thrust collar.

Further, the second means for damping axial movement comprises a wave spring. Also, the thrust collar is formed of a resinous material and is press fitted to the motor shaft so as to prevent rotational movement between the shaft and thrust bearing assembly, and to restrict lubricant flow along the shaft past the thrust bearing assembly.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

FIG. 2 illustrates a transverse section through the thrust bearing assembly.

FIG. 3 illustrates the same transverse section as in FIG. 2 of only the thrust collar.

FIG. 4 illustrates a plan view of the thrust collar.

FIG. 5 illustrates a partial section taken through a torque transmitting projection on the thrust collar.

FIG. 6 illustrates a partial section taken through a resilient hook objection on the thrust collar.

FIG. 7 illustrates a plan view of the thrust plate.

DETAILED DESCRIPTION OF THE DRAWINGS

Figure 1:
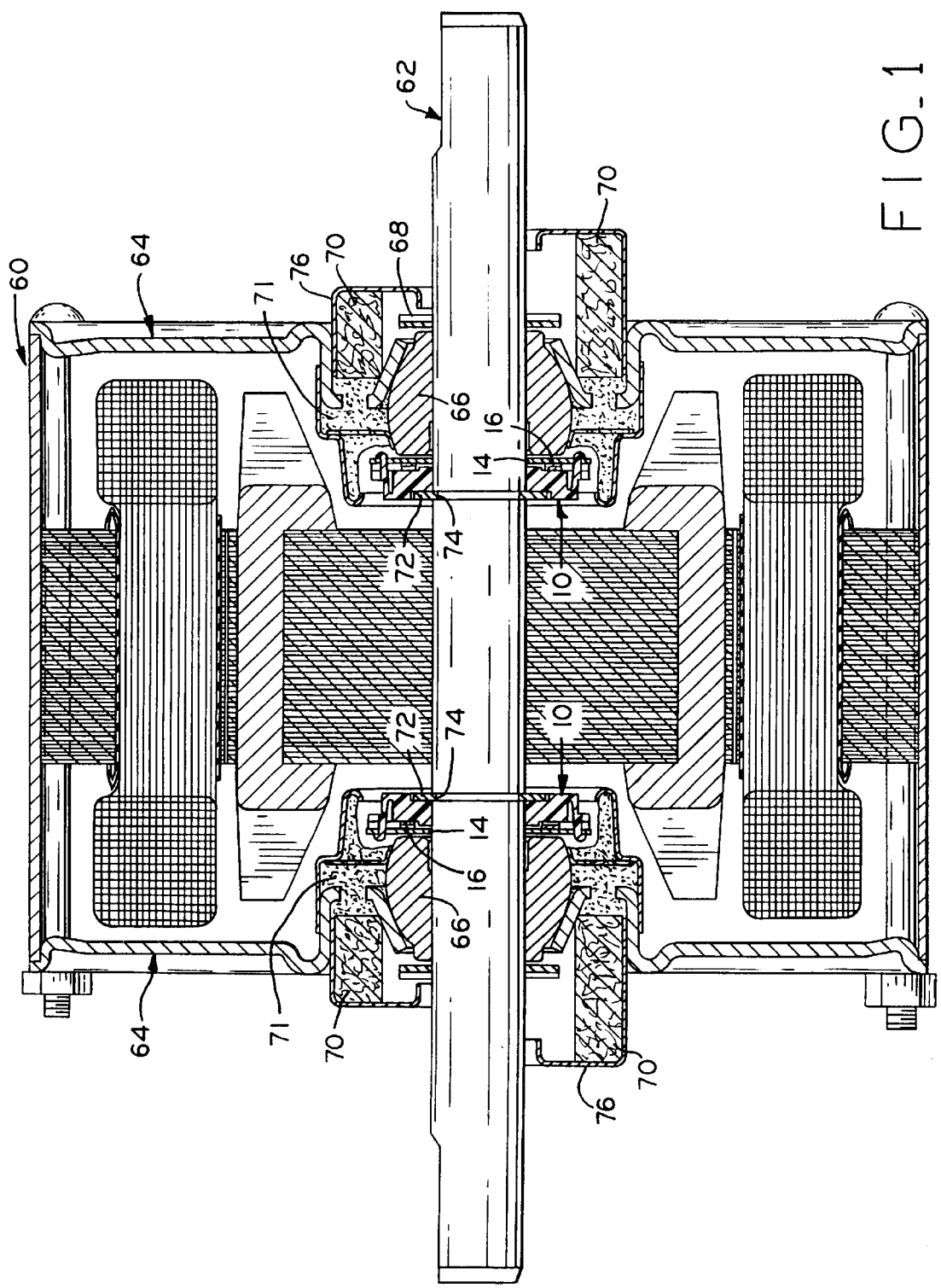
FIG. 1 illustrates a sectional view of a motor transverse to the longitudinal axis of the motor's shaft.

FIG. 1 illustrates a sectional view of, for example, a fractional horsepower motor taken transverse to the longitudinal axis of the motor's shaft 62. The shaft 62 rides in a pair of bearings 66 that are supported by the end plates 64 of the motor housing 60. Snap rings 72 fit in circumferential grooves 74 spaced axially along the shaft 62 at opposite ends of the rotor. The thrust bearing assemblies 10 are positioned between the bearings 66 and the snap rings 72 and are prevented by the snap rings 72 from moving axially inwardly toward the rotor.

During motor operation, there is a tendency for the lubricating oil to move along shaft 62 so as to provide lubrication between shaft 62 and bearings 66. The oil can, and most likely will, move in either direction between shaft 62 and bearings 66 (i.e., oil may move along shaft 62 outwardly away from the rotor or inwardly toward the rotor). The direction of oil movement or flow may change in response to changing operating conditions, and it may not always be practical (or necessary) to determine in which direction the oil moves for a particular set of conditions. When the oil moves outwardly away from the rotor, oil slingers 68 direct oil flow radially from the shaft 62 to spaced, concentric lubricant reservoirs 76. When the oil moves inwardly toward the rotor, thrust bearing assemblies 10 serve as oil slingers to similarly direct oil flow to reservoirs 76.

The stationary reservoirs are filled with porous wick material 70 for directing, by capillary action, the lubricant to shaft bearings 66, thus ensuring continued circulation of the oil and proper lubrication of bearings 66. Wick material 70 serves as "storage" wicks which comprise fibrous, solid pad-like structures which absorb, and are generally soaked in, lubricating oil. Inwardly adjacent these pad-like wicks are second wicking elements 71. Wicking elements 71 are formed of a mixture of short fibers and oil having a consistency which allows for injection into closed spaces, as illustrated in FIG. 1. Elements 71 have a relatively high density, as compared to wick material 70, to facilitate the flow of oil around bearings 66.

Referring now to FIGS. 2–7, each thrust bearing assembly 10 comprises a thrust collar 12, a thrust plate 14 and a wave spring 16. Resilient hook projections 18 of the thrust collar 12 engage the thrust plate 14 by insertion through apertures 52 formed in the thrust plate 14. A wave spring 16 is positioned between the thrust collar 12 and thrust plate 14.

The thrust collar 12 is somewhat circular and disk-shaped, although other geometries may be used. Thrust collar 12 is illustratively formed of resinous material. It has a center opening 22 for accommodating shaft 62. A circular indentation 24 is formed in one axial face of the collar 12 for receiving the snap ring 72 when thrust bearing assembly 10 is fully assembled and mounted on shaft 62. Indentation 24 is formed adjacent center opening 22 and extends radially outwardly therefrom to a radially outer surface 26. Snap ring 72, when fitted into the circumferential groove 74 in the shaft 62, prevents axial movement of the thrust bearing assembly 10 axially inwardly along shaft 62 into the rotor.

A wave spring positioning ridge 30 is formed on the opposite axially facing surface of the collar 12 adjacent to the center opening 22. Ridge 30 extends radially outwardly from the center opening 22 to a radially outer surface 32. The wave spring 16 is designed to ride outside the radially outer surface 32 and thereby maintained centered about the shaft 62. The collar 12 includes a radially outer edge 35.

As best seen in FIG. 4, somewhat rectangular notches 36 are provided in the outer edge 35 at uniformly spaced-apart locations. The notches 36 extend radially inwardly from the edge 35 beyond a surface 37 which is spaced radially inwardly from edge 35.

Torque transmitting projections 20 alternate perimetrally with notches 36. As best seen in FIG. 5, the torque transmitting projections 20 are axially extending truncated cones, whose bases where they are joined to collar 12 are wider than their remote ends. As best seen in FIG. 6, the resilient hook projections 18 extend axially through the notches 36 from surface 40 beyond the axially facing surface 33 of the collar 12. Each hook projection is provided with a rounded shoulder 44 having an engaging surface 46, which lies generally parallel to the plane of surface 33.

Referring now to FIG. 7, the thrust plate 14 is generally circular, although other geometries may be used. The thrust plate 14 is preferably formed of metal and has a center aperture 48. The diameter of the aperture 48 is slightly larger than the diameter of the center opening 22 of the thrust collar 12, and is also larger than the outer diameter of shaft 62. The thrust plate 14 has a plurality of circumferentially spaced, U-shaped notches 50 for receiving the torque transmitting projections 20. A plurality of circumferentially spaced, oval apertures 52 are provided in the thrust plate. These alternate circumferentially around the thrust plate 14 with the U-shaped notches 50 around the thrust plate 14.

Apertures 52 receive resilient hook projections 18. The radially outer edge 54 of each aperture 52 is positioned at a radial distance from the center of thrust plate 14 slightly less than, but approximately equal to the radial distance of the distal surface 49 of each resilient hook projection 18 from the center of thrust collar 12. In operation, the engaging surface 46 of each shoulder 44 engages the axial surface of the thrust plate 14, and the distal surface 49 of each resilient hook projection 18 contacts the radially outer edge 54 of a respective aperture 52.

During assembly, a wave spring 16 is laid on surface 33 of the collar 12 so as to encircle the wave spring positioning ridge 30. With the wave spring in place, the thrust plate 14 is aligned so that the U-shaped notches 50 line up with the torque transmitting projections 20, and the oval-shaped apertures 52 align with the resilient hook projections 18 formed on the thrust collar 12. Pushing the thrust plate 14 onto the collar 12 resiliently deflects the resilient hook projections 18 to bend radially inwardly until the engaging surface 46 clears the axial surface of the thrust plate 14, at which time, the hook projections 18 snap into position with the distal surfaces 49 of the resilient hook projections 18 contacting the radially outer edges 54 of respective apertures 52.

The engaging surfaces 46 of the resilient hook projections 18 are spaced sufficiently from surface 33 of the thrust collar 12 to permit the thrust plate 14 to ride between the engaging surfaces 46 and surface 33 of thrust collar 12, and permit wave spring 16 to be compressed during operation. In the assembled and unloaded thrust bearing assembly 10, wave spring 16 is partially compressed which serves to hold thrust bearing assembly 10 in its assembled configuration.

During assembly of motor 60, thrust bearing assemblies 10 are press fitted to the motor shaft 62 and are located between respective snap rings 72 and shaft bearings 66. Thrust bearing assemblies 10 dampen the axial movements of the shaft 62 by butting up against the bearings 66 and absorbing at least a portion of the impact energy. During axial movement of the motor shaft 62, the thrust plates 14 come into contact with the stationary shaft bearing 66. The larger diameter of the center aperture 48 allows the shaft movement to continue after the thrust plate 14 contacts the bearing 66. Further movement of the shaft 62 compresses the wave spring 16, setting up a force within the spring that is proportional to the amount of compression and which acts against axial surface 33 of the thrust collar 12 to oppose the movement of the shaft 62. The opposing force is transmitted by the collar 12 directly to the snap ring 72 and thus to the shaft 62. Because the opposing force is proportional to the amount of compression, there is a gradual damping of the movement of the shaft 62. Without the wave spring 16 to absorb the impact, the shaft 62 would bump against the shaft bearing 66, giving rise to a knocking noise.

The thrust bearing assemblies of the present invention are useful in a method of making an electric motor which comprises the following steps: mounting a rotor core on a shaft; mounting a pair of thrust bearing assemblies on either side of the rotor core to form a rotor sub-assembly; mounting a first end of the shaft of the rotor sub-assembly into a bearing portion of a first end shield/bearing sub-assembly; positioning a motor frame/stator sub-assembly over the rotor sub-assembly; and mounting a second end of the shaft into a bearing portion of a second end shield/bearing sub-assembly. The end shields and motor frame are then secured together, such as by bolts or screws, to complete the assembly. This method is particularly well-suited to an automated assembly process. The sub-assembly operations involved in producing the various components of the motor (i.e., the thrust bearing assemblies, the end shield/bearing sub-assemblies, etc.) can take place away from the assembly line under controlled conditions.

Although the invention has been described in detail with reference to certain illustrative embodiments, variations and modifications exist within the scope and spirit of the invention as described and defined in the following claims.

What is claimed is:

1. A method of making an electric motor, comprising the steps of:

a) mounting a rotor core on a shaft;

b) mounting a pair of thrust collars on either side of the rotor core;

c) mounting a pair of springs on either side of the rotor core;

d) mounting a pair of thrust plates on either side of the rotor core so that each of the thrust plates is coupled to a different one of the thrust collars and each of the springs is disposed between a different one of the thrust collars and the thrust plates to form a first bearing sub-assembly and a second bearing sub-assembly;

e) mounting a first end of the shaft into a bearing portion of a first end shield;

f) positioning a motor frame/stator sub-assembly over the rotor subassembly; and g) mounting a second end of the shaft into a bearing portion of a second end shield.

2. A method according to claim 1, comprising the additional step of securing the first and second end shields to the motor frame.

3. The method of claim 1, further comprising the additional steps of:

h) positioning the first end shield adjacent one of the thrust plates; and i) positioning the second end shield adjacent the other thrust plate.

4. The method of claim 1, further comprising the additional steps of press-fitting each of the thrust collars to the motor shaft so as to restrict relative rotation of the thrust collar and the shaft and so as to restrict lubricant flow along the shaft past the thrust collar.

5. The method of claim 1, further comprising the additional step of forming the thrust collar from a resinous material.

6. The method of claim 1, further comprising the additional steps of:

h) forming the thrust collar to include a plurality of perimetrally spaced-apart hook projections; and i) forming the thrust collar to include a plurality of perimetrally spaced-apart torque-transmitting projections.

7. The method of claim 6, further comprising the additional step of forming the thrust collar so that the hook projections alternate with the torque-transmitting projections.

8. The method of claim 6, further comprising the steps of:

h) forming the thrust plate to include perimetrally spaced-apart apertures to receive the hook projections; and i) forming the thrust plate to include a plurality of perimetrally spaced-apart notches into which ends of the torque-transmitting projections extend.

9. The method of claim 1, further comprising the additional steps of:

h) disposing a first reservoir adjacent the first end shield;

i) disposing a second reservoir adjacent the second end shield;

j) mounting the first bearing sub-assembly on the shaft adjacent the first reservoir so that the first bearing sub-assembly serves as an oil slinger for returning oil from the bearing portion of the first end shield to the first reservoir; and k) mounting the second bearing sub-assembly on the shaft adjacent the second reservoir so that the second bearing sub-assembly serves as an oil slinger for retuning oil from the bearing portion of the second end shield to the second reservoir.

10. A method of making a thrust bearing sub-assembly for an electric motor, comprising the steps of:

a) forming a thrust collar to include a plurality of perimetrally spaced-apart hook projections;

b) forming a thrust plate to include a plurality of perimetrally spaced-apart apertures;

c) disposing a spring adjacent the thrust collar;, and d) positioning the hook projections in the apertures of the thrust plate to secure the spring between the thrust collar and the thrust plate thereby forming the thrust bearing sub-assembly.

11. The method of claim 10, further comprising the additional steps of:

e) forming the thrust collar to include a plurality of perimetrally spaced-apart torque transmitting projections; and f) forming the thrust plate to include a plurality of perimetrally spaced-apart notches into which ends of the torque transmitting projections extend.

12. The method of claim 1, wherein the hook projections alternate with the torque-transmitting projections.

13. The method of claim 10, wherein the thrust collar is formed from a resinous material.

14. A method of making a thrust bearing sub-assembly for an electric motor, comprising the steps of:

a) forming a thrust collar to include a plurality of perimetrally spaced-apart hook projections;

b) forming a thrust plate to include a plurality of perimetrally spaced-apart apertures;

c) disposing a spring means adjacent the thrust collar;

d) positioning the hook projections in the apertures of the thrust plate to secure the spring means between the thrust collar and the thrust plate thereby forming the thrust bearing sub-assembly;

e) forming the thrust collar to include a plurality of perimetrally spaced-apart torque transmitting projections; and f) forming the thrust plate to include a plurality of perimetrally spaced-apart notches into which ends of the torque transmitting projections extend.

15. A method of making a thrust bearing sub-assembly for an electric motor, comprising the steps of:

a) forming a thrust collar to include a plurality of perimetrally spaced-apart hook projections;

b) forming a thrust plate to include a plurality of perimetrally spaced-apart apertures;

c) disposing a spring means adjacent the thrust collar;

d) positioning the hook projections in the apertures of the thrust plate to secure the spring means between the thrust collar and the thrust plate thereby forming the thrust bearing subassembly;

e) forming the thrust collar to include a plurality of perimetrally spaced-apart torque transmitting projections; and f) forming the thrust plate to include a plurality of perimetrally spaced-apart notches into which ends of the torque transmitting projections extend;

wherein the hook projections alternate with the torque-transmitting projections.

16. The method of claim 9, wherein said first and second bearing sub-assemblies are positioned on the shaft by snap rings disposed between the thrust collars and the rotor core.

17. The method of claim 1, further comprising the additional steps of:

h) forming a groove in the shaft on either side of the rotor core, and i) fitting a snap ring in each groove to prevent axial movement of the bearing sub-assemblies inwardly along the shaft into the rotor.

* * * * *